United States Patent [19]
Irmler

[11] 3,964,619
[45] June 22, 1976

[54] ARRANGEMENT FOR STORAGE OF GOODS IN PACKAGES IN AN UPRIGHT DEPOSITORY

[76] Inventor: Felix Irmler, Oberdorstrabe 21, CH - 8820, Wadenswil, Switzerland

[22] Filed: July 25, 1975

[21] Appl. No.: 599,189

Related U.S. Application Data

[63] Continuation of Ser. No. 339,965, March 9, 1973, abandoned.

[30] Foreign Application Priority Data
Mar. 13, 1972 Germany............................ 2212085
Oct. 26, 1972 Germany............................ 2252584
Feb. 1, 1973 Germany............................ 2304975

[52] U.S. Cl. .............................. 214/16 B; 221/119; 221/124; 221/293; 221/297; 214/8.5 K
[51] Int. Cl.². .......................................... B65G 1/04
[58] Field of Search ............ 214/8.5 R, 8.5 K, 16 B, 214/16.4 R; 221/7, 237, 119, 124, 293, 297

[56] References Cited
UNITED STATES PATENTS
| | | | |
|---|---|---|---|
| 3,623,618 | 11/1971 | Shaw................................ | 214/8.5 K |
| 3,658,194 | 4/1972 | Gendron.......................... | 214/8.5 K |
| 3,705,657 | 12/1972 | Arnemann....................... | 214/8.5 K |

FOREIGN PATENTS OR APPLICATIONS
| | | | |
|---|---|---|---|
| 1,280,749 | 10/1968 | Germany.......................... | 214/8.5 K |
| 212,562 | 4/1967 | Sweden............................. | 214/8.5 K |
| 595,435 | 12/1947 | United Kingdom.......... | 214/16.1 BB |

*Primary Examiner*—Robert J. Spar
*Assistant Examiner*—R. B. Johnson
*Attorney, Agent, or Firm*—Burns, Doane, Swecker & Mathis

[57] ABSTRACT

A matrix type storage unit including a series of upright storage units and a bottom loading, goods handling means.

7 Claims, 17 Drawing Figures

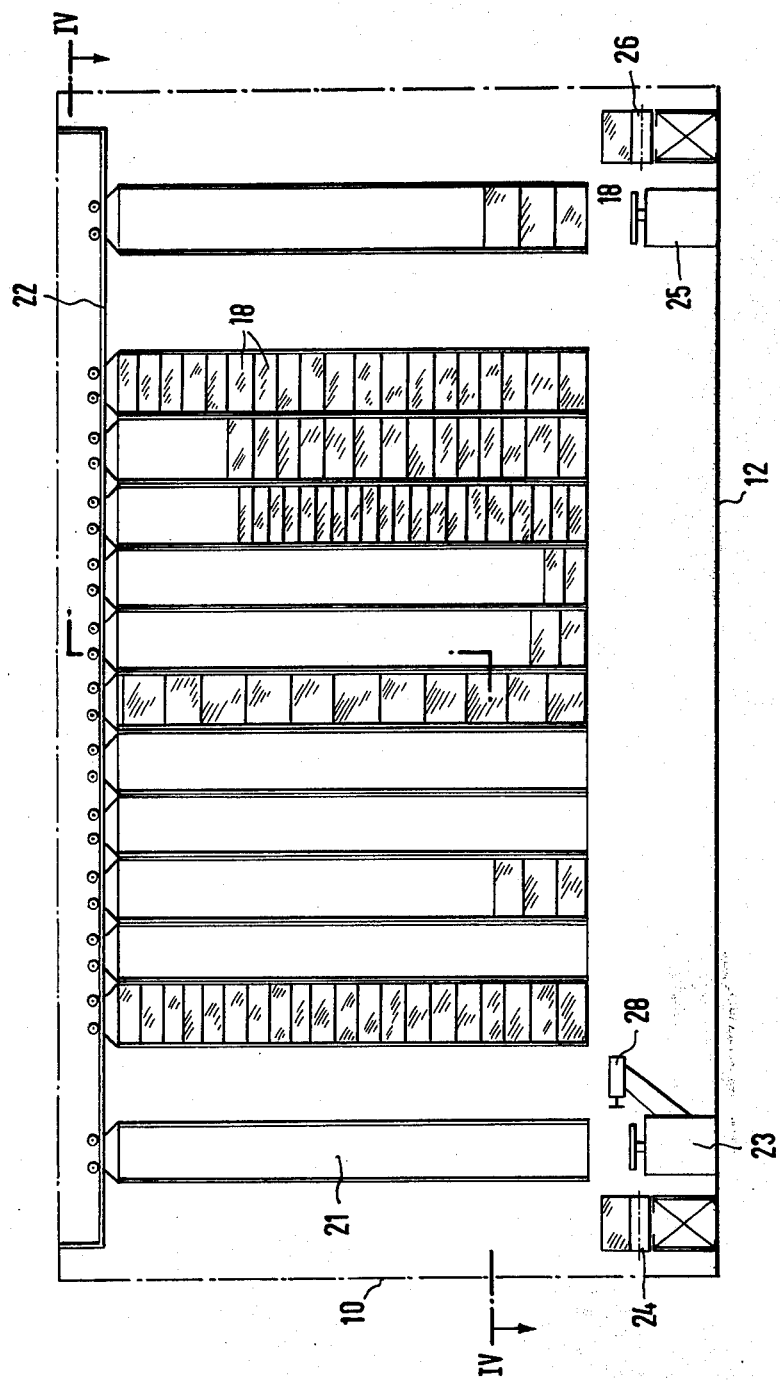

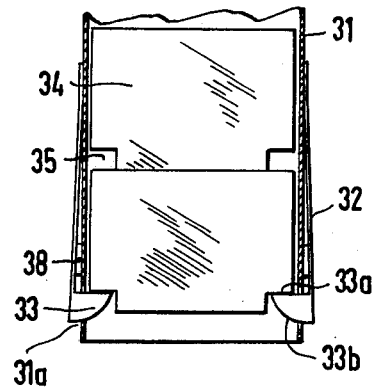
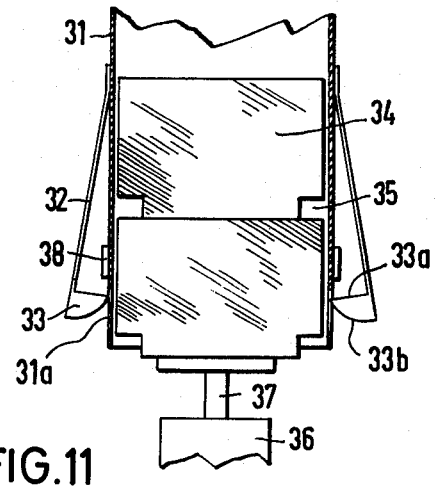
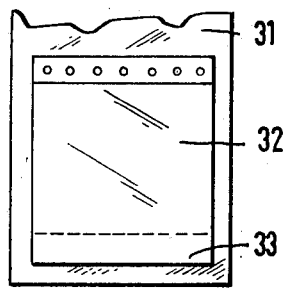
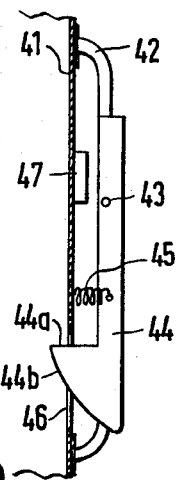
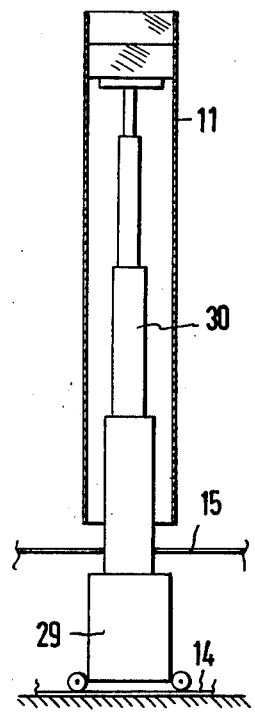
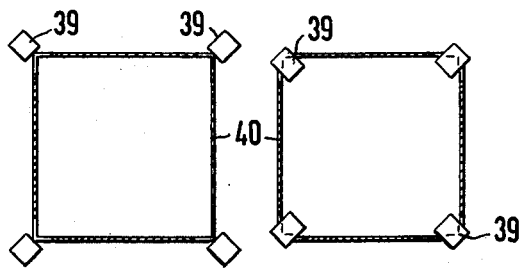

ARRANGEMENT FOR STORAGE OF GOODS IN PACKAGES IN AN UPRIGHT DEPOSITORY

This is a continuation of application Ser. No. 339,965, filed Mar. 9, 1973, now abandoned.

GENERAL BACKGROUND, OBJECTS, AND SUMMARY OF INVENTION

The invention relates to an arrangement for the storage of goods in packages in an upright depository and consists of a large number of storage pipes (tubes). These pipes are coordinated in their inside cross sectional dimensions with the outside dimensions of the packages, and have supporting arrangements, supporting the packages, which project into the cross section of the pipes. These pipes are also suspended above the floor in the storage space vertically one beside the other in rows, and form a matrix with several rows. The pipes are positioned at a distance above the floor, which corresponds at least to the height of one package. The invention includes an unloading conveying unit which can be brought into alignment with the storage pipes, whereby the distance of the unloading, conveying unit from the lower edge of the pipes is at least equal to the height of the packages.

An arrangement of this kind, which is used mainly for the storage of bags, etc., has the disadvantage that the packages can be put into the storage pipes only from above, and taken out from below, whereby the packages will drop out at the lower end from the pipes onto a conveyer belt. This arrangement thus is not acceptable in cases where breakable goods are to be stored. Moreover, fundamentally, the space above the matrix of pipes required for putting in of the packages is needed and in addition a feed arrangement at the upper end of the pipe is required.

Therefore, the invention is based on the objective of developing a storage arrangement of the initially mentioned kind in such a way that the loading and unloading can be accomplished at the lower end, insofar as there are no special requirements, so that the matrix pipes can fill the storage space to its ceiling. Above all, however, it is to be possible also to stack heavy or breakable goods in the storage pipes and to remove it again from said pipes without endangering the goods.

The solution of this task is accomplished by the unloading conveying unit having an elevating piston for putting in and taking out a package into or from a storage pipe, which piston can be raised at least to the lower edge of said storage pipe.

Numerous modifications and advantageous further developments are possible in order to construct the arrangement with a view to the pertinent requirements of the depository concerning its special design or with a view to the goods that are to be stored or to the conditions of loading and removal. Thus, for example, the pipes can be suspended movably and thus can be movable over a fixed loading and unloading conveying unit, whereby a particular pipe is then each time disengaged from the matrix for the loading or unloading process and later is again inserted.

However, the depository with a fixed matrix and with transportation units, which are moved to a certain storage pipe fully automatically and electrically programmed, in order to put in packages or to remove them from there, also has a large range of application.

In a large number of further developments of the invention and depending on the individual situations and requirements, both the storage pipes as well as the loading and unloading conveying units can be developed specifically. Thus it is possible, for example, to develop the loading and unloading unit in such a way that they press or urge the packages upwardly from the lower end of the pipe where they are put in, to its upper end, where they are taken off again in the sense of a "first in-first out" system.

It is also possible to develop the storage pipes such that entire pallets can be put in, which then do not stand directly on one another, but wherein the individual pallets are born by carrying chains with carrying projections movable vertically on the storage pipes, whereby the carrying chains shift vertically.

Another important advantage of a special embodiment is to be seen in the fact that the storage pipes can be composed of individual angular segments, so that a certain adjustment of the inside cross section of the pipe and thus an adaptation to the pertinent size of the package is possible.

Thus, the upright depository for pipes according to the invention is very variable.

DRAWINGS

The invention will now be described in connection with the figures of the drawing and on the basis of a number of possible embodiments.

FIG. 5 shows a schematic elevation of the depository of FIG. 4;

Figure 4:
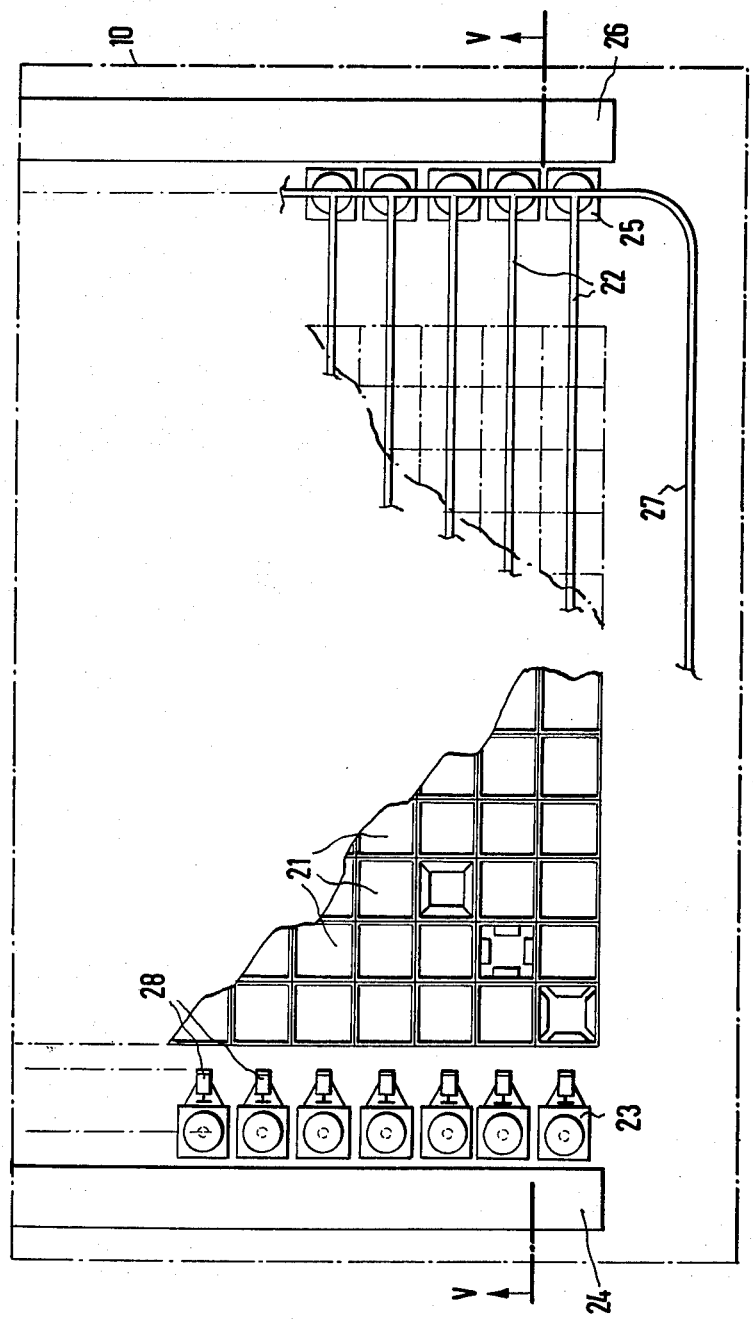
FIG. 4 is a top view of a diagrammatic view of a second variation of the upright depository according to the invention following line IV—IV in FIG. 5.
Figure 14:
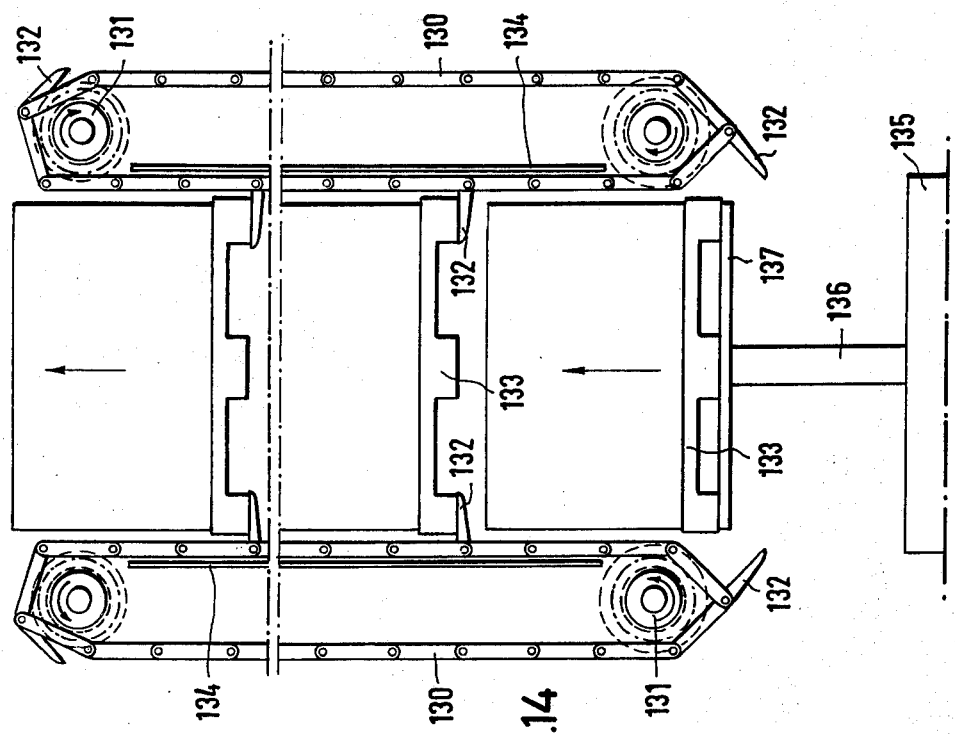
Figure 13:
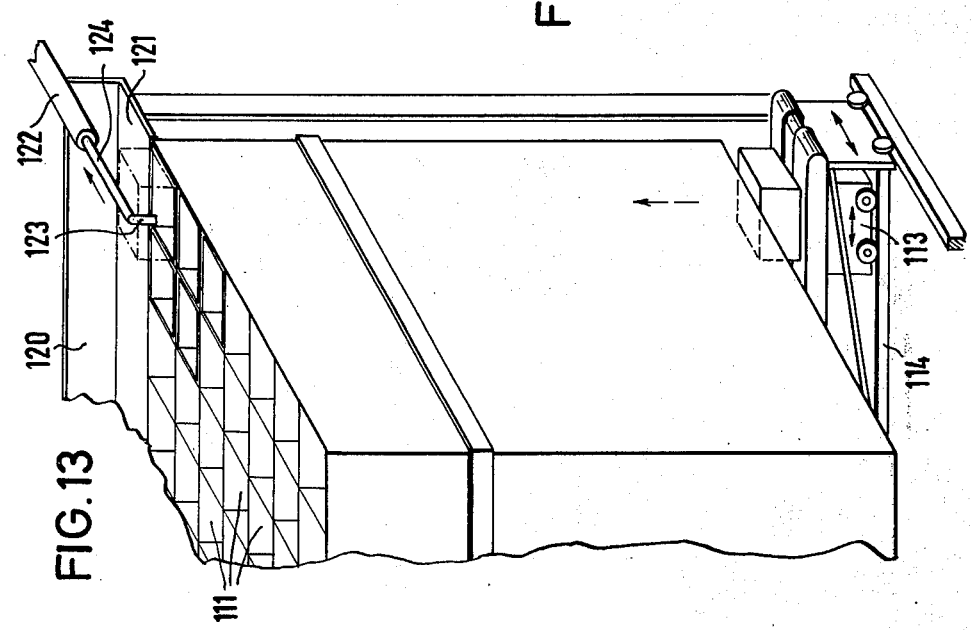
Figure 15:
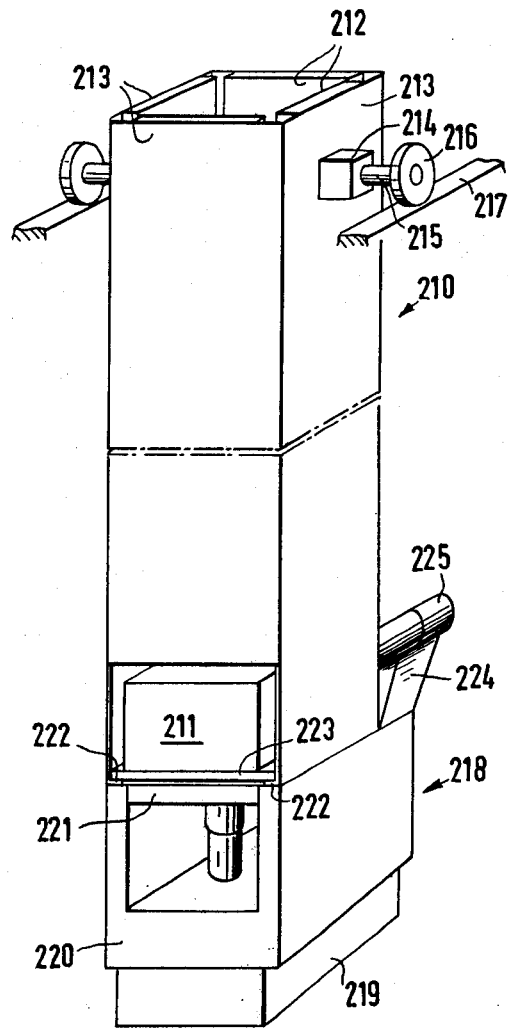
Figure 16:
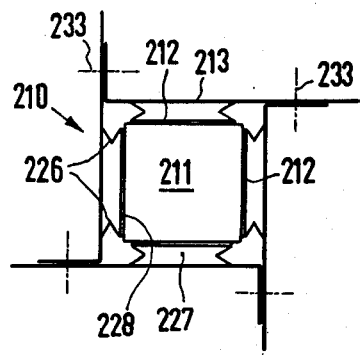

FIGS. 6, 7, and 8 show a mechanical holding arrangement at the lower end of a storage pipe in different views and different operating positions;

FIGS. 9 and 10 show a second type of the holding arrangements at the lower end of the storage pipes in two different operating positions;

FIG. 11 is a third variation of a holding arrangement;

FIG. 12 shows schematically a loading and unloading unit with a telescoping piston for a depository according to the "first in-first out" system;

FIG. 13 shows the combination of a lower and an upper bridge with a lower loading and unloading unit and an upper draw hook for a device according to the "first in-first out" system;

FIG. 14 is a storage pipe construction with revolving or movable carrying chains for receiving heavy pallets;

FIG. 15 is a simplified schematic presentation of a movable storage pipe with a locally fixed loading and unloading device in a storage system according to FIGS. 4 and 5;

FIG. 16 is a top view of a possible embodiment of the pipe of FIG. 15; and

Figure 17:
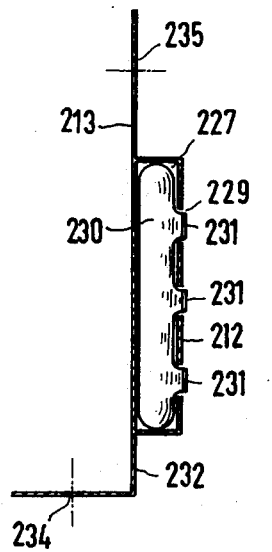

FIG. 17 shows a vertical cut through another embodiment of a lateral change element of the pipe according to FIG. 15.

DETAILED DESCRIPTION

FIGURES 1–3 EMBODIMENT

Figure 1:
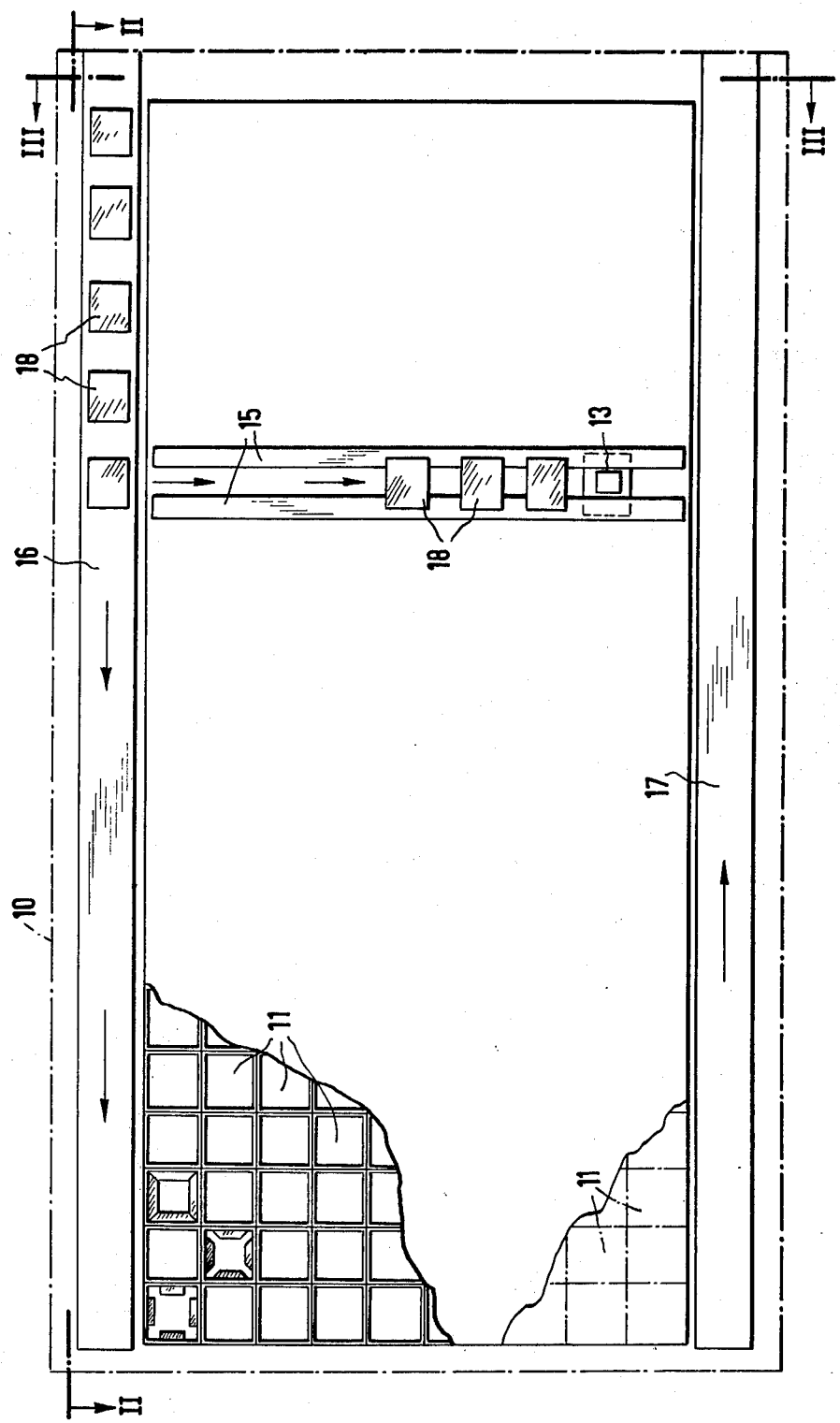
FIG. 1 shows a plan view of an upright depository according to the invention, with stationary storage pipes put together in one block.
Figure 2:
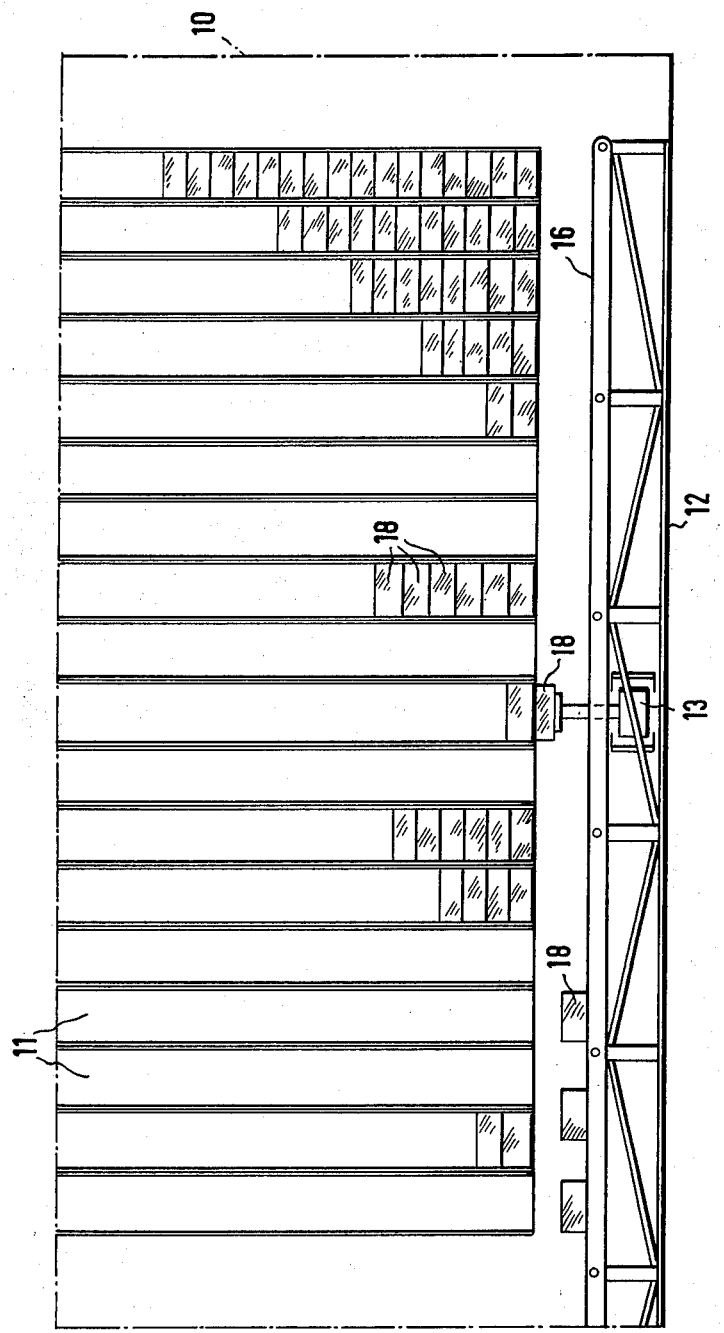
FIG. 2 shows the upright depository according to FIG. 1 in side view following line II—II in FIG. 1.
Figure 3:
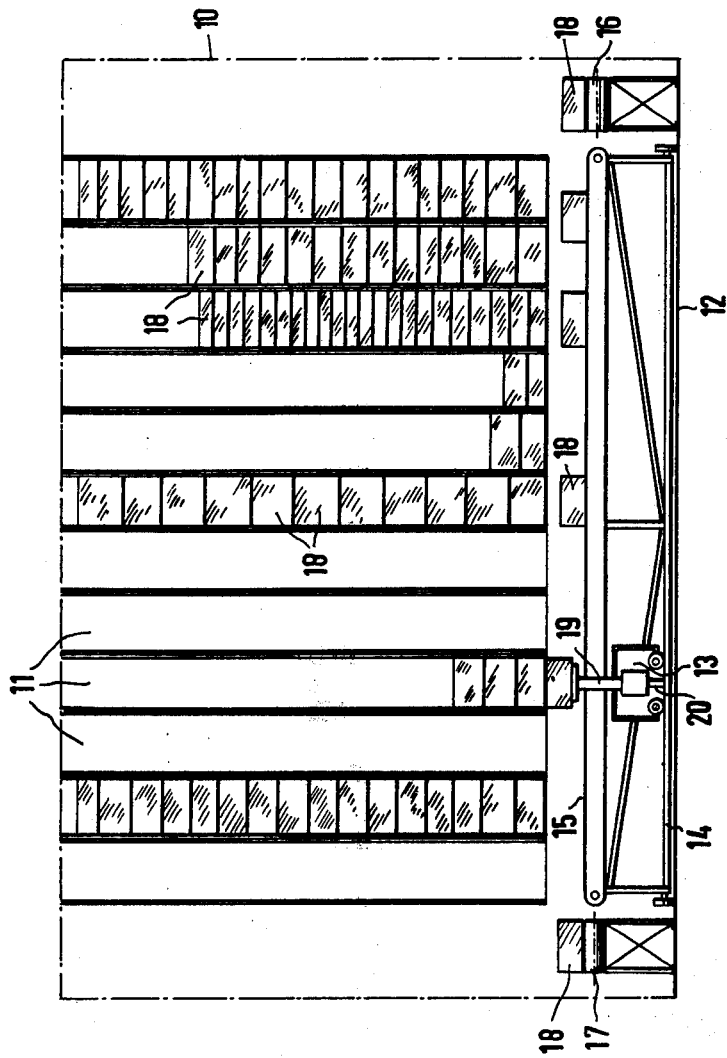
FIG. 3 shows the same upright depository in front view following line III—III in FIG. 1.

The FIGS. 1, 2 and 3 show a first variation of an upright depository embodying the invention in its overall structure and its manner of functioning.

This variation has a matrix of locally fixed storage pipes 11 in a storage building 10, which essentially occupy the entire space of the storage building and which, as FIGS. 2 and 3 make clear, are kept at a certain distance above the floor 12 of the building. The pipes, as indicated schematically in FIG. 1 in a part of the matrix shown, are synchronized or coordinated in their inside cross section with the outside cross section of the packages that are to be stacked in them. They are filled more or less with packages which becomes clear from the FIGS. 2 and 3.

In the free space below the storage pipes, loading and unloading units 13 are movable on tracks 14 in the direction of the rows, whereby these tracks are shiftable in the direction of the gaps (in FIG. 1 from left to right and vice versa). The loading and unloading units 13 can thus be moved below every individual storage pipe for insertion. As shown in FIG. 3, parallel to the tracks 14 of the loading and unloading units 13 there is a conveyer belt 15 on which packages, fed in by a feeder belt 16 running on one side of the matrix, are conveyed to the loading-unloading unit 13, so that they can be pushed by the latter at a predetermined and selected place into a storage pipe. On the other hand, the loading-unloading unit 13 can deposit packages, which it takes from the storage pipes, upon the conveyer belt 15, which then transports the packages to a discharge belt 17, on the side of the matrix opposite to the feed belt. The feed belt and discharge belt are customary conveyer belts for goods. Bumpers or deflectors or similar devices on the feeder belt can see that packages will change over or move from one belt to the other under control at the desired point to the transverse conveyer belt 15. In the case of the embodiment shown, the transverse conveyer belt 15 consists of two parallel and synchronized belts, between which the raisable and lowerable piston of the hydraulic or pneumatic loading-unloading device fits, and which parallel belts are operable to support opposite edges of packages.

Effectively, there are several tracks 14, developed as movable bridges, for the loading-unloading units 13, with each pertinent conveyer belt, below the matrix depending on the size and need for turnover in the storage area. Even more than one, customarily two, loading-unloading units can be disposed on one track. The tracked bridges in that case can be moved across a special area of the matrix assigned to them especially.

In the case of a preferred embodiment, two such parallel tracks, each with a loading-unloading device, are disposed on one bridge, with the distance between them equaling one row. This embodiment is not shown in the drawing, but quite intelligible to the expert without difficulty. The tracked bridge for the loading-unloading units 13 and the conveyer belt 15 can be supported on the floor 12 of the building over its entire length by means of several rollers, if this appears necessary for reasons of mechanical support.

Individual packages are designated in the figures by 18, and they are partly in the storage pipes, partly on the conveyer belt and partly on the feeder belt 16 or the discharge belt 17.

The process of operation of the conveying bridge 14 and of loading-unloading device 13 movable thereon, as well as the assigning of the packages that are to be stored, is accomplished by way of a small EDV installation, or computer system, fully automatically.

The loading-unloading devices 13, in their carriage movable on the bridge, have a raisable and lowerable piston 19 which, whenever it is in alignment with the selected storage pipe and in case of charging, additionally with a package fed in on the conveyer belt, is raised by supply of a pressure medium, between the parallel belts of the conveyer belt 15 up to a level in the area of the lower edge of the storage pipes 11. The precise loading and unloading process will be described later on in detail.

Since the weight of a complete stack of packages of one storage pipe may rest under certain circumstances on the loading-unloading device 13, it will be effective before raising the lifting piston 19 to prop up the loading-unloading device on the floor 12 of the storage building. This can be accomplished by a support strut or footpad 20 on the loading-unloading device, movable first with the aid of a customary pressure controlled reversing valve, so that the entire weight of the stack of packages need not be absorbed by the tracked bridge 14. The withdrawing of the supporting strut 20 prior to renewed moving of the loading-unloading unit can be accomplished by the aid of a pull-back spring (not shown).

FIGURES 4–5 EMBODIMENT

FIGS. 4 and 5 show another variation of the upright depository according to the invention.

In this variation, which likewise has a matrix comprising a large number of storage pipes 21, the storage pipes are suspended from carrier tracks 22 running in the upper area of the rows. Therefore, they are not locally fixed as in the first example, but movable within the storage area from one place to another. The storage building has been designated here, too, by 10 and the floor by 12. An unloading unit 23 is assigned to every row at one end and in front of the gap between the unloading units 23 (see FIG. 4) there is a discharge belt 24. At the opposite end, a loading unit 25 is assigned to each row. The pipes of each row can be moved on their carrier track 22 both above the loading unit 25 as well as above the unloading unit 23. A feeder belt 26 runs in front of the line of the loading units 25.

FIG. 4 also shows that there also is a bypass rail 27, by way of which pipes emptied at one of the unloading units 23 can be moved back to the loading side, where they are loaded again and are again arranged in one of the rows, suspended from the pertinent carrier track 22. The unloading units have a push-out cylinder with a piston 28, with the help of which a package taken from one of the pipes 21 suspended above it is pushed onto the discharge belt 24 located in front of it.

In this variation, too, selection of the pertinent storage pipe, removal of a package and the replacement of the storage pipe in its row, the return transportation by way of the bypass rail 27 to the proper loading unit, etc., can be accomplished and controlled, fully automatically by a small computer.

Solutions for laying the track and placing the switches of the carrier tracks 22, 27 are obvious for the expert in the field. Therefore, no special explanations for this are needed here.

The storage form with fixed loading and unloading units and movably suspended storage pipes could probably be recommended for the storage of goods, the number of types of which does not surpass the number of matrix rows, so that in a matrix row only packages of the same types of goods are stored. With this arrangement, the access to a pipe in the midst of a row is possible only if the pipes located closer to the loading or unloading unit are moved away first. This, however, would require a considerable effort.

On the other hand, it is different in case of a depository of the first variation with pipes fixed in the matrix. Since the loading and unloading devices can be moved underneath every individual pipe, any access to every pipe is possible at any time and with the same effort, so that, strictly speaking, a different type article can be stored in every pipe.

On the other hand, however, the storage variant with a fixed matrix of the pipes is more suited for such a depository, where the packages to be stored change as rarely as possible in their dimensions, for an adjustment of the inside cross sectional measurements of the pipe is very difficult, once the pipes are fixed in the matrix. This problem, in turn, lends itself particularly to the pipes, which, according to the second variation, are transported after every complete unloading process on the return rail 27 to the loading end of the rows. Here it will now be possible to reset the pipes to a new inside diameter according to need.

The preceding explanations therefore show that the special problems, which occur in the case of storage of goods in packages, have already been fully considered by the two basic variations shown.

FIGURE 13 SUBVARIATION (FIRST IN-FIRST OUT)

A subvariation of the development of the upright depository according to the invention with a fixed matrix of the storage pipes III is shown in FIG. 13.

To a conveying and tracked bridge or truss 114 running underneath the pipes, for the packages to be fed in and for the loading device 113, a corresponding bridge or truss 120 is assigned. The bridge 120 is connected or movable with bridge 114 and is located above the pipes III. The bridge 120 has a conveyer belt 121 to receive packages removed from the pipes on the top. Both bridges 114 and 120 are controlled together, so that the bridge for the reception of the packages is always available at the upper end of the pipe, whenever a loading and unloading device is moved at the lower end underneath the corresponding row of pipes. The upper bridge, in addition, has a compressed air cylinder 122. This cylinder actuates a draw hook 123, on the cylinder piston rod 124, to translate across the corresponding sotrage pipe, underneath which the loading and unloading unit 113 is moved. The loading and unloading unit 113 and the cylinder 122 are always controlled together. The package forced out of pipe III on top is pulled with draw hook 123 onto the conveying belt 121.

The purpose of this arrangement is that only the loading of the pipes is accomplished from the underside of the matrix of storage pipes; the packages, on the other hand, are again removed at the upper end of the storage pipes on a "first in-first out" system, which has the advantage of a division of plane surfaces for the loading and unloading of the depository, whereby differences in height caused by the terrain or else as a result of production can be overcome favorably at the same time under certain circumstances. At the same time, it is understood that the conveyer belt on the top 121 must be somewhat displaced or offset with respect to the row of the storage pipe that is just to be unloaded, so that the packages will not be impeded emerging from the upper end of the storage pipe 111.

In connection with a depository of the last described type, it will be necessary to use a loading and unloading device 29. At its lower end, as FIG. 12 shows, device 29 has a telescoping piston 30 which can be raised to at least the upper edge of the storage pipe 11. The remaining elements of the depository, with the exception of the discharge belt 17, remain unchanged, as in embodiment shown in FIGS. 1 to 3.

HOLDING ARRANGEMENTS

The holding arrangements, with which at least the lowest package of the stack of packages piled up in each storage pipe is held, can be developed differently.

In FIGS. 6 to 8, 9 and 10, various embodiments representing a selection are shown by way of example.

In case of a first, particularly simple embodiment of the holding arrangements, shown in FIGS. 6–8, spring steel sheets 32 are attached rigidly, for example, by means of screws or rivets at their upper transverse end, on at least two opposite outside walls of each storage pipe 31. These spring steel sheets carry beamlike carrier strips 33 along their lower transverse end, with an upward directed, at least horizontal carrier surface 33a and a beveled, downward directed ramp surface 33b. The packages 34 are provided with recesses 35 along their lower edges with which the carrier beams 33 can engage, even if two packages are standing one immediately on top of the other. The carrier beams reach through slits 31a, dimensioned correspondingly, in the lateral walls of the storage pipes 31. On the outsides of the walls 31 of the storage pipes, permanent magnets 38 are attached, which take care that the carrier beams 33, forced resiliently into the recesses 35, should not inadvertently be spread out and away, so that then the entire column of packages would tumble out of the storage pipe.

The holding arrangement according to FIGS. 6 to 8 is especially suited for a depository with "first in-first out" operation, i.e., a depository in which the packages are introduced from the lower cut into the storage pipe, but do not need to be taken from the pipes again at the lower end. The insertion is accomplished with the help of the loading device 36 with lifting piston 37.

A package lying on the lifting piston is pressed from below against the receiving opening of the storage pipe 31 and in doing so it strikes with its upper edge against the ramp surfaces 33b of the carrier beams 33. As a result of the spreading force developing thereby, the spring sheets 32 are forced to the outside and torn away from the holding magnets 38. The package can then be lifted by the lifting piston 37, supporting the entire column of packages, until the carrier beams 33 gliding along on the lateral surfaces of the packages snap with their lower edges into the lower recess 35 of the package. At the same time they are held again by the holding magnets 38. The lifting piston can subsequently be withdrawn again into the loading device 36.

The removal in a downward direction is difficult in case of a holding arrangement of this type, insofar as the carrier beams cannot be moved simply out of the recesses 35.

Instead of the carrier beam, individual carrying projections can be provided on the inside of the spring sheet 32 which penetrate through corresponding holes in the lateral wall of the pipe 31 and which engage with corresponding recesses 35 in the packages.

A further holding development is shown schematically in FIGS. 9 and 10.

Here there are individual blocks 39, likewise attached to the spring sheets, on the edges of the storage pipe 40 and they enter through the appertures (not shown) into corresponding recesses of the packages, in order to support them in the same way as had been described in connection with the FIGS. 6 to 8. These blocks 39, too, have a slanting ramp surface on the underside, so that they are spread apart from below, whenever a package is inserted. Naturally they can also be secured magnetically.

A further variation of the holding arrangement at the lower end of a storage pipe is shown in FIG. 11. There, two brackets 42 are screwed on or attached in a similar manner on at least two opposite side walls 41 of each storage pipe, in parallel, and at a distance and between these brackets there runs horizontally a swiveling axle 43 on which at least one double armed hooked lever 44 is arranged swivelably. This lever on its lower end has the customary carrying hook with a horizontal upper carrier surface 44a, and a bottom side slanting ramp surface 44b. The lower end of the lever is connected via a spring element 45 with the side wall 41 of the storage pipe, so that the hook is pulled through an opening 46 in the side wall of the pipe into the cross section of the pipe. In this embodiment, too, the hook is swung outward counter to the force of the spring 45, whenever a package is pushed from below by means of the lifting piston of a loading-unloading device into the pipe, and the hook of the lever 44 snaps into a recess which is provided on the package whenever the package has been pushed far enough upwards in the pipe. If, however, the lowest package is to be taken downward out of the pipe, then it will be lifted slightly by the piston of the (not shown) loading and unloading device so that the hook is released, and an electromagnet 47, which is opposite the upper lever and outside on the wall 41 of the storage pipe, receives a current surge, as a result of which the lever is swiveled outward, counter to the force of the spring 45 and that now the package can be lowered without impediment, since the hook has emerged outwards from the recess. The holding arrangement thus makes possible the loading and unloading of the storage pipe from its lower end.

Naturally, the energizing of the electromagnet 47 is made under control in connection with the control commands for the lifting of the pressure piston and is otherwise blocked advantageously by this control, so that holding arrangements cannot be swiveled out arbitrarily, the consequence of which would be a tumbling out of the entire contents of the pipe.

It has not been shown in detail in the drawing; however, it will be appreciated that in certain cases in which the packages do not require outside protection, the storage pipes can be replaced also by angular profile rails along the edges of the pipes, determining merely the profile of the cross section, which rails for the sake of reinforcement are connected with one another by distancing struts. Also, feed funnels can be provided at the lower ends of the pipes, which bring about a certain alignment of the packages fed in from below on the lifting pistons of the loading and unloading devices.

FIG. 14 EMBODIMENT (PALLETS)

FIG. 14 shows schematically another embodiment of the apparatus of the invention, with which particularly heavy packages or goods on pallets can be stored.

Each storage pipe has two carrying chains 130 on two opposite sides at a distance from one another which extend from the lowest to the topmost end of the pipe, and which are guided there via sprocket wheels 131. There are carrying projections 132 on the links of the chain which project into the inside space of the pipes, so that the packages or, in the case illustrated, the pallets 133 are supported by them. The distance between the carrying projection 132 in the longitudinal direction of the chain is dimensioned corresponding to height provided for one package.

The carrying projections are attached swivelably on the chain links in such a way that they fold right onto the chain links on the downwards moving strand of the chain because of their own weight, so that the downward moving strand of the chain only requires little space. When the lower sprocket wheels 131 revolve, the carrying projections then automatically swing out of the chain and are secured into position by way of suitable abutment means.

Because of a possible break of the chains due to the load of the packages, it will be effective to support said chains by guide rails 134, etc. in their upward moving and loaded strand, so that the carrying projection cannot be deflected downwards due to chain deflection.

In order to hold the packages firmly, the chains must be provided with a return lock, which can either be accomplished by the fact that at least one sprocket wheel of each chain has a return lock of its own (i.e., one-way clutch) or that the sprocket wheels of all chains are interconnected and a single return lock is provided. Such a one-way movement device can also be disengageable at will whenever a removal of the packages at the lower end of the storage pipes is intended.

In FIG. 14, the loading and unloading unit is designated schematically by 135. It carries on its lifting piston 136 a pallet 133 which is inserted into the pipe from below.

The carrying projections of the two chains located on the side of the pipe can be connected with a cross bar, in order to create thus a larger supporting surface for the feet of the pallet. Naturally, the carrying platform 137 of the lifting piston must have corresponding recesses for the carrying projections in order that the lifting piston can again be removed downwards after pushing in of the pallet.

PIPE STRUCTURE

FIGS. 15 to 17 show a storage pipe 210 in more detail, in connection with a locally fixed loading and unloading device 218, such as can be used in the embodiment of the overall arrangement by way of example in FIGS. 4 and 5. The vertically disposed pipe 210 has been drawn square in the present case for the sake of simplicity, whereby the inside cross section is slightly larger than the outside cross section in the direction perpendicularly to the pipe's longitudinal extent of the packages 211 which are to be stored in the pipe and are to be discharged from the pipe.

Every outside wall of the pipe 210 carries inside at a distance an inside wall 212; the inside surface of this inside wall 212, which comes into contact with the packages, is shiftable in relation to the outside walls 213. The outside walls 213 and also the inside walls 212 are made of a hard plastic such as polystyrene, polypropylene or glass fiberreinforced polyster, so that they are ipso facto of little weight. On two opposite lateral surfaces of the pipes, blocks 214 are attached on two corresponding outside surfaces, from which wheel axles 215 with wheels 216 project laterally, by way of which the pipes can be moved on rails 217 in the storage area.

The pipe 210 is shown in its delivery position, i.e., it is above a loading and unloading unit 218, which is set up locally fixed, at a delivery point of the depository mostly immediately beside a passing (not shown) conveyer belt. The functions of this loading and unloading unit 218 will become clear with all details from the succeeding description.

The loading and unloading unit 218 shown in a simplified form consists of three parts, vertically shiftable in relation to one another: the base (foot) 219 with which it stands on the floor, a body part 220, which generally is shiftable vertically in relation to the base by means of hydraulic or pneumatic pistons, and a table 221 which on its part is vertically shiftable in relation to the body part 220.

In case of the embodiment shown here, two opposite sides of the pipe are shortened by a little more than the height of one package, as compared to the two other sides of the pipe, so that the lower package 211 is accessible on two front sides. The two longer sides of the pipe, moreover, have no additional inside walls 212 in their lower extended section, and they are provided with an inward shoulders 222 at their lower ends, on which lies a carrying platform 223 vertically shiftable which is secured only against horizontal shifting from out of the pipe.

For the operation of pipe 210 in cooperation with the loading and unloading unit 218, the body part 220 is moved from the underside against the pipe. At the same time, engaging couplings, not shown in the drawing, engage upon contact of the loading and unloading unit with the pipe, in which couplings there are at the same time connections which transfer to the opposite connection on the pipe, the control means, e.g., compressed air or electric control commands for the controlled movement of the surfaces of the inner walls of the pipe. The entire stack of packages at this time lies loosely superposed on the carrying platform (bottom) 223. As a next step the table 221 is moved toward the underside of the carrying platform 223 and is then raised a little, together with the platform and the stack of packages.

Upon a control command, which is delivered from the body part 220 to the loading and unloading unit, the inside wall surfaces are pressed against the lateral walls of the packages by way of the connections and opposite connections, with the exception of the lowest package, so that all packages in the pipe except the bottom one are held. The table 221 is then lowered, whereby the carrying platform 223 with the lowest package 211 on it will follow and come to rest on shoulders 222.

In the rear, a cylinder piston unit 225 stands on a block 224 at the extended rear body part 220, facing an opening formed by the shortening of the two pipe walls, and as the result of a control command, the piston (not shown) of the cylinder piston unit is pressed against the package 211. It pushes the package from the carrying platform 223 onto the conveyer belt (not shown) in front of it. By a further command the clamping force of the inner wall surfaces 212 is loosened, so that the remaining stack of packages in the pipe can slip down to the carrying platform 223 and the overall arrangement is ready for the delivery of another package.

FIG. 16 shows a possible embodiment of the pipe in a horizontal section view. At the same time, it is to be assumed that the chambers formed between the outside walls 213 and the inside walls 212 are closed in a longitudinal direction. It is then possible to shift the outside and inside walls, connected with one another by bellows 226, in relation to one another, by feeding in of compressed air by way of the connections and counterconnections in the control unit 218 and at the lower end of the pipe 210, and thus to clamp the packages 211 in the shaft of the pipe 210.

Instead of a pressure tight closure of the chambers 227 themselves, it is also possible to insert hoselike pouches in them, which, after being filled with compressed air, will press the inside walls 212 against the packages. Effectively, the inside walls 212 are coated with a layer 228 of slip resistant raw material so that the contact force does not need to be too high.

Another embodiment, with the inside wall 212 being attached rigidly in relation to the outside walls 213, is shown in FIG. 17. In this case, oblong holes 229 with longitudinal extension in the longitudinal direction of the pipes are recognizably made in the inside wall 212, and the hoselike pouch 230 in the chamber 227, whenever it is inflated by compressed air, can penetrate through these oblong holes 229 and thus clamp the packages, whereby advantageously burls or wear and friction surfaces 231 are molded on the outside surface of the hoselike pouch. The hoselike pouch thereby gains strength, is given an extended useful life, and, as the result of a proper shaping of the surface of the burls, good friction can be achieved.

FIGS. 16 and 17 also show an advantageous construction of the pipe comprising four individual angle sections 232. These angle sections are connected with one another at various places across their longitudinal extent by means of screw bolts 233, whereby these screw bolts pass through round holes 234 in the short sides and oblong holes 235 in the long sides, constituting the side walls of the pipe. The oblong holes permit a certain adjustment and thus adaptation of the inside cross section of the pipe 210 to the outside measurements of the packages 211.

The loading of the pipes can be accomplished from above, but also from below with a basically similarly constructed second loading and unloading unit, by pushing the individual packages up.

It is advantageous if the ejection cylinder 225 in the completely lowered state of the body part of the loading and unloading unit 218 will lie entirely below the carrying platform 223, since then the moving of a new pipe over the cylinder 225 can be accomplished without impediment.

The possibility of placing several pipes on top of one another has not been shown specially, for which purpose the individual pipes will again have to have couplings at their upper ends for the counter couplings at the lower ends of the pipe above it.

The type of suspension shown can be modified so that, for example, the pipe is suspended from a single rail.

SUMMARY OF MAJOR ADVANTAGES AND SCOPE OF INVENTION

It will be possible with the help of the arrangement described to issue packages in any number and variation of composition fully automatically by way of a central computer from a depository equipped with a large number of such units. At the same time, one will achieve a hitherto unknown high degree of exploitation of space of the upright depository.

Those familiar with this disclosure and skilled in the art may recognize additions, deletions, substitutions or other modifications which would fall within the scope of the invention as defined in the appended claims.

What is claimed is:

1. Apparatus for storing and removing packages of goods at an upright depository comprising:
   a floor;
   a plurality of upright storage units;
   means mounting said plurality of storage units in side-by-side relation to form a row, there being a plurality of adjacently located rows of storage units defining a matrix;
      each storage unit defining a vertical storage chamber having a cross section sized to receive and store a single stack of said packages;
   said storage units each having selectively releasable support means projecting into the cross section of the storage unit adjacent a lower end thereof, said support means being arranged to support an entire stack of packages in such storage unit independently of packages stored in other storage units in the same row;
   means mounting said storage units at a distance above said floor at a predetermined distance;
   a transfer conveying system for delivering and removing packages to and from said storage units comprising:
      a bridge conveyor disposed on said floor beneath said matrix of storage units, said bridge conveyor including an endless conveyor belt means;
      means for moving said bridge conveyor from one row to another so that said conveyor belt means is selectively alignable with a plurality of the rows of storage units so as to extend beneath and across each selected row;
      means mounting said endless conveyor belt means from the lower ends of said storage units by a distance which is at least equal to the height of at least one of said packages;
      loading and unloading conveyors located at opposite ends of said bridge conveyor and at substantially the same height thereof for delivering and removing packages to and from said bridge conveyor;
      means for moving said conveyor belt means to convey a package from said loading conveyor belt along a row of storage units to a selected storage unit thereof, and to receive a package from a selected storage unit and convey such package to said unloading conveyor; and
      a traveling loading-unloading unit mounted on said bridge conveyor for movement relative to said bridge conveyor and relative to said storage units along a path of travel disposed below a selected row of storage units beneath which row said bridge conveyor is disposed, said path of travel of said loading-unloading unit extending below and along a plurality of storage units in said selected row so that said loading-unloading unit is selectively locatable below said plurality of storage units in said selected row, said loading-unloading unit including a raisable and lowerable member oriented relative to said endless conveyor belt means to:
         raise a package from said endless conveyor belt means into a selected one of said storage units, exclusive of other storage units in said selected row, to a height therein at least above the level of said releasable support means of said selected storage unit so that said package lifts and supports packages located thereabove and is then itself supported by said releasable support means, and lower a bottom package from a selected storage unit exclusive of other storage units in said selected row onto said endless conveyor belt means for conveyance to said unloading conveyor belt.

2. Apparatus as in claim 1, characterized in that said bridge conveyor includes two spaced endless conveyor belts running in parallel on opposite sides of said raisable and lowrable member, said raisable and lowerable member being vertically movable between said endless conveyor belts for raising and lowering packages onto and from said endless conveyor belts.

3. Apparatus as in claim 1, wherein said loading-unloading unit includes an extendable and retractable supporting strut, operable to support said raisable and lowerable member on said floor during lifting and lowering of a package.

4. Apparatus as in claim 1, wherein said releasable support means each include at least two package-holding projections operable to move laterally into and out of said storage unit and engage and release a package.

5. Apparatus as in claim 4, wherein said projections are developed as ramp surfaces, operable to be engaged by an upwardly moving package and moved laterally outwardly of said units.

6. Apparatus as in claim 4, wherein said releasable support means further includes swiveling levers swivelable upon axes running parallel to lateral surfaces of said storage units; said projections comprise hooks carried at the lower end of said swiveling levers, and spring means arranged to bias said hooks in the direction of the inside of a respective storage unit.

7. Apparatus according to claim 1 wherein said loading-unloading unit includes means selectively actuable to stabilize said loading-unloading unit during package raising and lowering operations.

* * * * *